(12) United States Patent
Yun et al.

(10) Patent No.: US 12,440,906 B2
(45) Date of Patent: Oct. 14, 2025

(54) SLITTER

(71) Applicant: LG Energy Solution, Ltd., Seoul (KR)

(72) Inventors: Duck Joong Yun, Daejeon (KR); Wonjun Song, Daejeon (KR); Minsu Pak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 450 days.

(21) Appl. No.: 17/428,422

(22) PCT Filed: Oct. 5, 2020

(86) PCT No.: PCT/KR2020/013455
§ 371 (c)(1),
(2) Date: Aug. 4, 2021

(87) PCT Pub. No.: WO2021/107378
PCT Pub. Date: Jun. 3, 2021

(65) Prior Publication Data
US 2022/0140304 A1 May 5, 2022

(30) Foreign Application Priority Data
Nov. 25, 2019 (KR) .......... 10-2019-0152443

(51) Int. Cl.
*B23D 35/00* (2006.01)
*B23D 19/04* (2006.01)
(Continued)

(52) U.S. Cl.
CPC .......... *B23D 35/001* (2013.01); *B23D 19/04* (2013.01); *B26D 1/0006* (2013.01); *B23D 19/06* (2013.01);
(Continued)

(58) Field of Classification Search
CPC ...... B23D 35/001; B23D 19/04; B23D 19/06; B26D 2001/0053; B26D 2001/0066;
(Continued)

(56) References Cited

U.S. PATENT DOCUMENTS 3,730,043 A * 5/1973 Zimmermann ........ B23D 19/06
241/236
4,643,060 A * 2/1987 Fremion ................ B26D 7/10
83/675
(Continued)

FOREIGN PATENT DOCUMENTS

CN 209200084 U 8/2019
EP 0654328 A1 5/1995
(Continued)

OTHER PUBLICATIONS

JP-2001315089-A English translation; Nov. 13, 2001 Iida; B26D1/0006.*
(Continued)

*Primary Examiner* — Laura M Lee
(74) *Attorney, Agent, or Firm* — Lerner David LLP

(57) ABSTRACT

A slitter according to an embodiment of the present art includes: an upper knife disposed above the electrode plate to rotate, thereby cutting the electrode plate; and a lower knife disposed below the electrode plate to partially overlap the upper knife and rotate, thereby cutting the electrode plate together with the upper knife, wherein the upper knife includes: a first inner surface extending to be inclined from a tip formed at the lowermost end to the lower knife; and an outer circumferential surface extending to be inclined from the tip to an opposite side of the lower knife, wherein the first inner surface has an inclination at a first angle from a vertical line V that is perpendicular to a rotation axis that serves as a rotation center of the upper knife, and the outer
(Continued)

circumferential surface has an inclination at a second angle from the vertical line.

12 Claims, 5 Drawing Sheets

(51) Int. Cl.
  *B26D 1/00* (2006.01)
  *B23D 19/06* (2006.01)
(52) U.S. Cl.
  CPC ............ *B26D 2001/0046* (2013.01); *B26D 2001/0053* (2013.01); *B26D 2001/0066* (2013.01); *Y10T 83/783* (2015.04); *Y10T 83/9403* (2015.04)
(58) Field of Classification Search
  CPC . B26D 1/0006; Y10T 83/783; Y10T 83/9403; Y10T 83/9401
  See application file for complete search history.

(56) References Cited

U.S. PATENT DOCUMENTS

| | | | | |
|---|---|---|---|---|
| 5,365,821 | A * | 11/1994 | Munier | B26D 1/0006 83/675 |
| 5,423,239 | A * | 6/1995 | Sakai | G11B 5/84 83/345 |
| 5,423,240 | A * | 6/1995 | DeTorre | B26D 3/003 30/375 |
| 6,613,253 | B1 | 9/2003 | Negishi et al. | |
| 7,444,911 | B2 * | 11/2008 | Sanda | B26D 1/245 83/425.2 |
| 8,623,178 | B2 * | 1/2014 | Ohyabu | B26D 1/0006 242/525.7 |
| 2001/0052279 | A1 | 12/2001 | Sanda et al. | |
| 2006/0016308 | A1 * | 1/2006 | Katai | H01M 4/04 83/13 |
| 2009/0025525 | A1 * | 1/2009 | Sanda | B26D 1/0006 83/676 |
| 2009/0025526 | A1 | 1/2009 | Sanda et al. | |

FOREIGN PATENT DOCUMENTS

| | | | | |
|---|---|---|---|---|
| EP | 1088644 | A2 | 4/2001 | |
| JP | H11144713 | A | 5/1999 | |
| JP | 2001315089 | A * | 11/2001 | .......... B26D 1/0006 |
| JP | 2002273689 | A | 9/2002 | |
| JP | 2002273690 | A | 9/2002 | |
| JP | 2002343343 | A | 11/2002 | |
| JP | 2006007404 | A | 1/2006 | |
| JP | 2010253615 | A | 11/2010 | |
| JP | 2014073564 | A | 4/2014 | |
| JP | 2015153538 | A | 8/2015 | |
| KR | 20130098463 | A | 9/2013 | |
| KR | 101754443 | B1 | 7/2017 | |

OTHER PUBLICATIONS

JP2010253615-A English Translation; Nov. 11, 2010; Ishida Hirotaka; B26D1/24.*
International Search Report for Application No. PCT/KR2020/013455, mailing Jan. 4, 2021, 3 pages.
Extended European Search Report and European Search Opinion for European Patent Application No. 20893101.4 dated Feb. 28, 2022, 6 pgs.

* cited by examiner

SLITTER

CROSS-REFERENCE TO RELATED APPLICATION

The present application is a national phase entry under 35 U.S.C. § 371 of International Application No. PCT/KR2020/013455, filed on Oct. 5, 2020, which claims priority to Korean Patent Application No. 10-2019-0152443, filed on Nov. 25, 2019, which are hereby incorporated by reference in their entirety.

TECHNICAL FIELD

The present invention relates to a slitter, and more particularly, to a slitter which is capable of minimizing a generation of foreign substances such as dust to reduce an occurrence of defects of an electrode plate when the electrode plate is cut to manufacture an electrode.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

In order to manufacture an electrode assembly, a cathode (hereinafter, referred to as a positive electrode), a separator, and an anode (hereinafter, referred to as a negative electrode) are manufactured and stacked. Particularly, when the positive electrode and the negative electrode are manufactured, and then, the separator is interposed between the manufactured positive and negative electrodes, unit cells are formed. The unit cells may be stacked on each other to form an electrode assembly. Also, when the electrode assembly is accommodated in a specific case, and an electrolyte is injected, the secondary battery is manufactured.

In order to manufacture electrodes such as the positive electrode and the negative electrode, a coating process of applying positive electrode active material slurry to a positive electrode collector and applying negative electrode active material slurry to a negative electrode collector is performed first. Then, after preheating an electrode plate, a rolling process of passing the electrode plate through a pair of rolling rolls that are heated at a high temperature is performed. As a result, it is possible to improve capacitance density of each of the electrodes and improve adhesion between the electrode collector and the slurry. When the rolling process is completed, a slitting process of cutting the electrode plate to a certain width using a slitter is performed. Therefore, electrode manufacturing may be completed.

In general, the slitter includes an upper knife disposed above the electrode plate and a lower knife disposed below the electrode plate. However, when the electrode plate is cut after the applied electrode active material slurry is cured, the foreign substances such as dust are generated. Then, the foreign substances such as the dust are attached to the upper and lower knives of the slitter. Thus, when the electrode plate is cut using the slitter, defects may occur.

PRIOR ART DOCUMENTS (Patent Document 1) Japanese Patent Publication No. 2006-007404

DISCLOSURE OF THE INVENTION

Technical Problem

An object of the present invention for solving the above problems is to provide a slitter which is capable of minimizing a generation of foreign substances such as dust to reduce an occurrence of defects of an electrode plate when the electrode plate is cut to manufacture an electrode.

The objects of the present invention are not limited to the aforementioned object, but other objects not described herein will be clearly understood by those skilled in the art from descriptions below.

Technical Solution

A slitter according to an embodiment of the present invention for solving the above problem includes: an upper knife disposed above the electrode plate to rotate, thereby cutting the electrode plate; and a lower knife disposed below the electrode plate to partially overlap the upper knife and rotate, thereby cutting the electrode plate together with the upper knife, wherein the upper knife includes: a first inner surface extending to be inclined from a tip formed at the lowermost end to the lower knife; and an outer circumferential surface extending to be inclined from the tip to an opposite side of the lower knife, wherein the first inner surface has an inclination at a first angle from a vertical line V that is perpendicular to a rotation axis that serves as a rotation center of the upper knife, and the outer circumferential surface has an inclination at a second angle from the vertical line.

Also, the first angle may range of 0.6° to 1.1°.
Also, the first angle may range of 0.9° to 1.0°.
Also, the second angle may range of 80° to 90°.
Also, the second angle may range of 85° to 90°.
Also, the upper knife may further include a second inner surface extending inward from the first inner surface, wherein the second inner surface may be inclined at a third angle from the vertical line.
Also, the third angle may range of 2.6° to 3.1°.
Also, the third angle may range of 2.8° to 3.0°.
Also, the upper knife may be in line contact with the lower knife.
Also, in the upper knife, a horizontal distance from the tip to a contact point with the lower knife may range of 0.01 mm to 0.5 mm.
Also, in the upper knife, a horizontal distance from the tip to a contact point with the lower knife may range of 0.1 mm to 0.4 mm.
Also, the upper knife may have a total thickness of 3 mm to 5 mm.
Also, in the upper knife, the tip may be first in contact with the electrode plate.
Also, in the lower knife, an outer circumferential surface on which the electrode plate is seated may be formed to be flat.

Particularities of other embodiments are included in the detailed description and drawings.

Advantageous Effects

According to the embodiments of the present invention, there are at least the following effects.

When the slitter cuts the electrode plate to manufacture the electrode, the upper knife may include the first inner surface, which extends to be inclined from the tip to the lower knife, to minimize the generation of the foreign substances such as the dust, thereby reducing the occurrence of the defects of the electrode plate.

In addition, the upper knife may include the second inner surface, which extends inward from the first inner surface, to reduce the contact area between the upper knife and the lower knife, thereby sharply cutting the electrode plate.

The effects of the prevent invention are not limited by the aforementioned description, and thus, more varied effects are involved in this specification.

MODE FOR CARRYING OUT THE INVENTION

Figure 1:
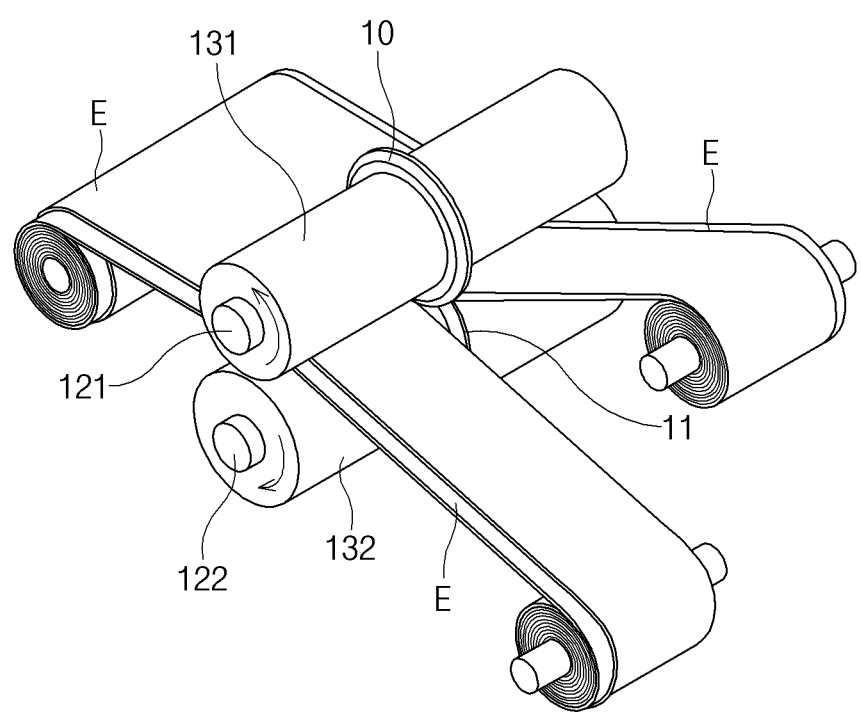
FIG. 1 is a perspective view illustrating a state in which a slitter cuts an electrode plate according to an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may include plural forms unless specifically mentioned. The meaning of "comprises" and/or "including" does not exclude other components besides a mentioned component.

Hereinafter, preferred embodiments will be described in detail with reference to the accompanying drawings.

FIG. 1 is a perspective view illustrating a state in which a slitter 1 cuts an electrode plate E according to an embodiment of the present invention.

In order to manufacture a secondary battery, slurry, in which an electrode active material, a binder, and a plasticizer are mixed with each other, is applied to a positive electrode collector and a negative electrode collector to manufacture electrodes such as a positive electrode and a negative electrode. Thereafter, the electrodes are respectively stacked on both sides of a separator to form an electrode assembly having a predetermined shape. Then, the electrode assembly is inserted into a battery case, an electrolyte is injected, and sealing is performed.

The positive and negative electrodes used in the present invention are not particularly limited, and the electrode active material may be prepared in a form bonded to an electrode collector according to the conventional method that is known in the art.

First, a coating process of applying positive electrode active material slurry to the positive electrode collector and applying negative electrode active material slurry to the negative electrode collector is performed. In the case of a lithium secondary battery, the positive electrode active material may include, for example, a layered compound such as lithium cobalt oxide ($LiCoO_2$) and lithium nickel oxide ($LiNiO_2$). Also, the negative active material may include, for example, carbon such as non-graphitized carbon and graphite-based carbon. In this case, if necessary, the slurry may further include a conductive agent, a binder, a filler, and the like.

When the coating process is completed, after preheating the manufactured electrode plate E, a rolling process of allowing the electrode plate E to pass between a pair of high-temperature heated rolling rolls is performed. As a result, it is possible to improve capacitance density of each of the electrodes and improve adhesion between the electrode collector and the slurry. Here, the adhesion between the electrode collector and the slurry, capacity density, and the like may be controlled by adjusting a distance between the rolling rolls and a temperature and rotation speed of each of the rolling rolls.

When the rolling process is completed, a slitting process of cutting the electrode plate E to a predetermined width by using a slitter 1 is performed. Therefore, electrode manufacturing may be completed.

Figure 2:
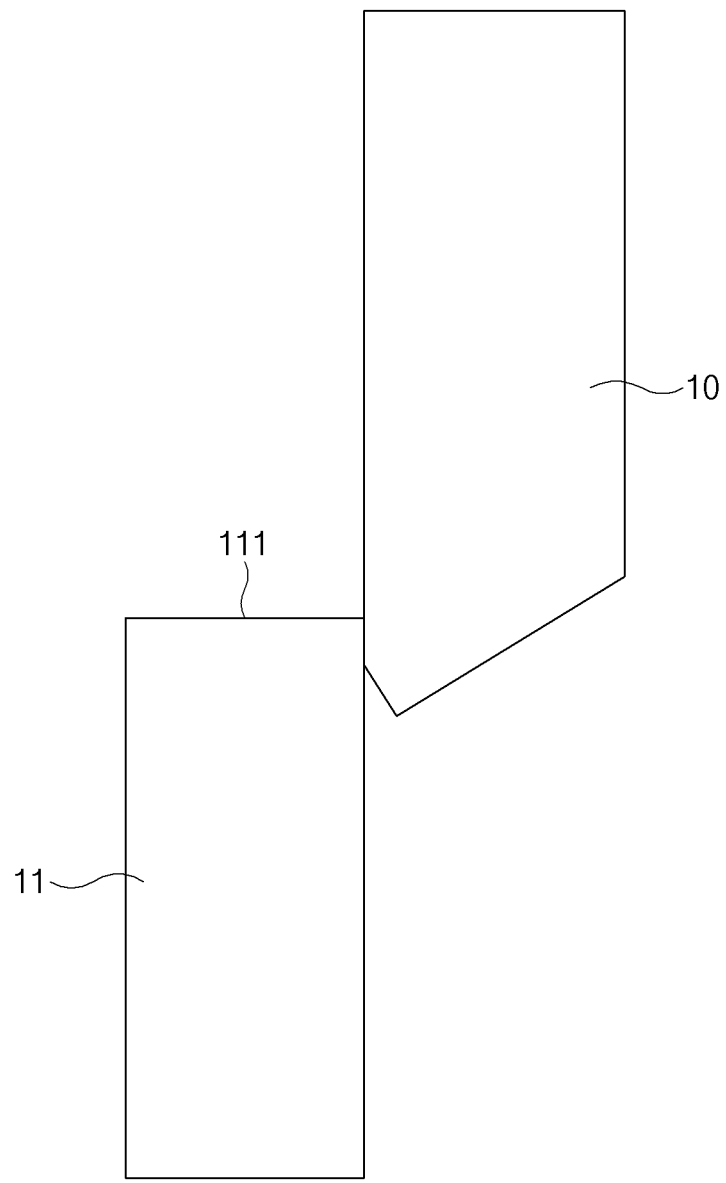
FIG. 2 is a cross-sectional view of the slitter according to an embodiment of the present invention.
Figure 3:
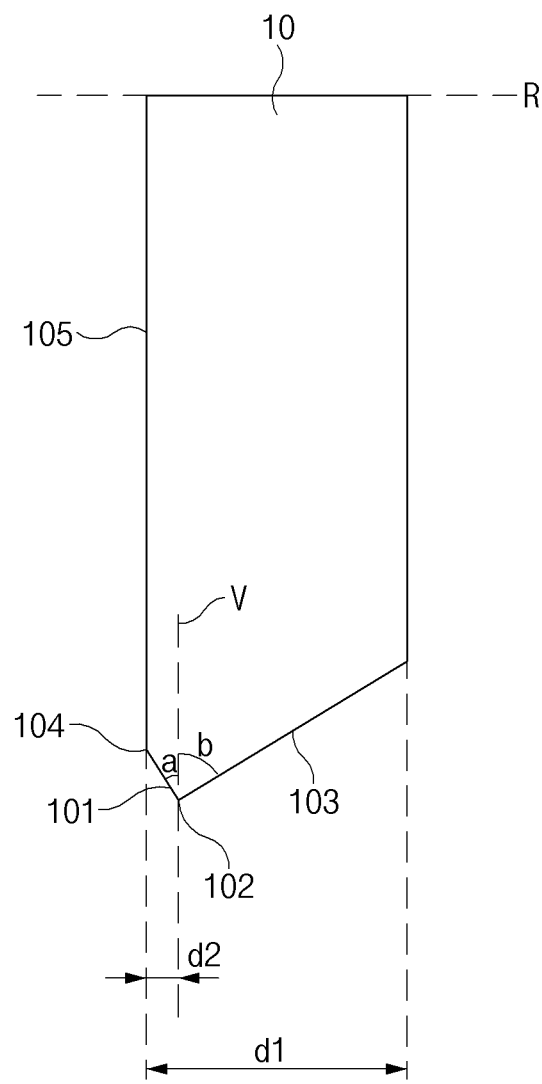
FIG. 3 is a cross-sectional view of an upper knife according to an embodiment of the present invention.

FIG. 2 is a cross-sectional view of the slitter 1 according to an embodiment of the present invention, and FIG. 3 is a cross-sectional view of an upper knife 10 according to an embodiment of the present invention.

According to an embodiment of the present invention, when the electrode plate E is cut to manufacture the electrode, a generation of foreign substances such as dust may be minimized to reduce an occurrence of defects of the electrode plate E.

For this, as illustrated in FIGS. 2 and 3, the slitter 1 according to an embodiment of the present invention includes: an upper knife 10 disposed above the electrode plate E to rotate, thereby cutting the electrode plate E; and a lower knife 11 disposed below the electrode plate E to partially overlap the upper knife and rotate, thereby cutting the electrode plate E together with the upper knife 10. The upper knife 10 includes: an inner surface 101 extending to be inclined from a tip 102 formed at the lowermost end to the lower knife 11; and an outer circumferential surface 103 extending to be inclined from the tip 102 to an opposite side of the lower knife 11. The inner surface 101 has an inclination at a first angle a from a vertical line V that is perpendicular to a rotation axis R that serves as a rotation center of the upper knife 10, and the outer circumferential surface 103 has an inclination at a second angle b from the vertical line V. Also, the first angle a may range of 0.6° to 1.1°.

The upper knife 10 is disposed above the electrode plate E to rotate together with the lower knife 11, thereby cutting the electrode plate E. In order to cut an object as sharply as possible, in the general slitter 1, a tip 102 of the upper knife 10 is formed in close contact with the lower knife 11. Therefore, it is preferable that the inner surface 101 does not exist separately on the upper knife 10. However, the electrode plate E has a shape in which the electrode active material slurry is applied to the electrode collector. Therefore, when the electrode plate E is cut using the general slitter 1 after the electrode active material slurry is cured, the foreign substances such as dust are generated. Also, the foreign substances such as dust are attached to the upper knife 10 and the lower knife 11 of the slitter 1, and when the electrode plate E is cut again using the slitter 1, there is a problem that defects occur.

In particular, in the case of the negative electrode, when compared to the positive electrode, the applied negative electrode active material slurry has higher brittleness. Therefore, when the electrode plate E of the negative electrode is cut, there is a problem that more foreign substances such as dust are generated.

Thus, according to an embodiment of the present invention, as illustrated in FIG. 3, the upper knife 10 includes 101 extending to be inclined from a tip 102 formed at the lowermost end to the lower knife 11 to the lower knife 11. The inner surface 101 has an inclination at a first angle a from a vertical line V that is perpendicular to a rotation axis R that serves as a rotation center of the upper knife 10.

The upper knife 10 is generally formed in a disk shape having a constant thickness, and a center of the upper knife 10 is connected to an upper knife shaft 121. Also, the upper knife shaft 121 is connected to an upper knife driving motor (not shown), and when the upper knife driving motor rotates, rotational force is transmitted to the upper knife 10 through the upper knife shaft 121. Thus, the upper knife 10 may rotate about the rotation axis R. A direction in which the upper knife 10 rotates is a direction in which the tip 102 of the upper knife 10 cutting the electrode plate E moves in the same manner as the electrode plate E. It is preferable that a total thickness d1 of the upper knife 10 range of 3 mm to 5 mm.

The tip 102 of the upper knife 10 is sharply formed at one end of the upper knife 10, particularly at the lowermost end to directly cut the electrode plate E together with the lower knife 11. When starting to cut the electrode plate E, the electrode plate E is seated on an outer peripheral surface of the lower knife 11 to move and then first in contact with the tip 102 of the upper knife 10. Also, the electrode plate E is cut by friction between the upper knife 10 and the lower knife 11. According to an embodiment of the present invention, since the inner surface 101 is formed, the tip 102 of the upper knife 10 is not completely in close contact with the lower knife 11 and is formed to be spaced by a specific distance d2.

The rotation axis R serving as the rotation center of the upper knife 10 is formed at an opposite side of the tip 102 of the upper knife 10 as illustrated in FIG. 3. It is preferable that the rotation shaft R matches a central axis of the upper knife shaft 121 connected to the upper knife 10. FIG. 3 illustrates that the upper knife shaft 121 is omitted so that the rotation shaft R is formed at the other end of the upper knife 10, but if the upper knife shaft 121 exists, the rotation shaft R is formed to be spaced apart from the other end of the upper knife 10.

As illustrated in FIG. 3, the inner surface 101 is formed to extend at an inclination from the tip 102 of the upper knife 10 to the lower knife 11 and is inclined at a first angle a from the vertical line V. Here, the vertical line V is not real, but is a line conceptually illustrated in FIG. 3 for convenience of explanation. This first angle a preferably range of 0.6° to 1.1°, and more preferably range of 0.9° to 1.0°. If the first angle a is greater than 1.1°, the electrode plate E may not be cut sharply, and if the first angle a is less than 0.6°, a problem that the foreign substances such as dust are generated may not be solved still. Since the first angle a is quite small, in the upper knife 10 according to an embodiment of the present invention, the tip 102 has a chamfered shape on the upper knife 10 of the general slitter 1.

Since the inner surface 101 is inclined at the first angle a, the tip 102 of the upper knife 10 is not completely in close contact with the lower knife 11 and is formed to be spaced apart by a specific distance d2. Here, the specific distance d2 means a horizontal distance from the tip 102 of the upper knife 10 to a contact surface 104 with the lower knife 11. If the inner surface 101 is formed as a flat surface, the specific distance d2 may be a sine value of the first angle. According to an embodiment of the present invention, the specific distance d2 preferably ranges of 0.01 mm to 0.5 mm, and more preferably range of 0.1 mm to 0.4 mm. The distance of 0.5 mm may be a significantly small distance, but as described above, since the total thickness d1 of the upper knife 10 ranges of 3 mm to 5 mm, the distance may be a distance corresponding to approximately 10% to 15% of the total thickness d1

As illustrated in FIG. 3, a support surface 105 refers to an outer surface of an outer wall facing the lower knife 11 among outer walls of the upper knife 10. According to an embodiment of the present invention, the support surface 105 is formed to extend upward from the inner surface 101. The support surface 105 may be formed parallel to the vertical line V, but may be formed at a specific angle with respect to the vertical line V.

The outer circumferential surface 103 is formed to extend from the tip 102 of the upper knife 10 toward an opposite side of the lower knife 11. The outer circumferential surface 103 is considerably wider than the inner surface 101 and has an inclination at a second angle b, which is a constant angle from the vertical line V. This second angle b preferably ranges of 80° to 90°, and more preferably ranges of 85° to 90°. If it is less than 80°, there is a problem that a plastic strain rate increases at the cut surface of the electrode plate E, and if it is larger than 90°, the outer peripheral surface 103 has a problem that causes interference with the electrode plate E or the lower knife 11.

The lower knife 11 is disposed to partially overlap the upper knife 10 under the electrode plate E and then rotates to cut the electrode plate E together with the upper knife 10. Like the upper knife 10, the lower knife 11 is generally formed in a disk shape having a constant thickness, and a center of the lower knife 11 is connected to a lower knife shaft 122. Also, the lower knife shaft 122 is connected to a lower knife driving motor (not shown), and when the lower knife driving motor rotates, rotational force is transmitted to the lower knife 11 through the lower knife shaft 122. Thus, the lower knife 11 may rotate about a separate rotation shaft (not shown). A direction in which the lower knife 11 rotates is a direction that is opposite to the direction in which the upper knife 10 rotates.

It is preferable that the outer peripheral surface 111 of the lower knife 11 is formed to be flat so that the electrode plate E is stably seated. Also, the upper knife 10 and the lower knife 11 are disposed to partially overlap each other. As a result, a cross-section of the electrode plate E cut by the upper knife 10 and the lower knife 11 may be clean and sharp.

In the upper knife 10 and the lower knife 11, an upper knife spacer 131 and a lower knife spacer 132, each of which has a predetermined width, may be formed in the upper knife shaft 121 and the lower knife shaft 122, respectively. If the slitter 1 includes a plurality of upper knifes 10 and lower knifes 11, the plurality of upper knifes 10 may be spaced apart from each other, and the plurality of lower knifes 11 may be spaced apart from each other.

Figure 4:
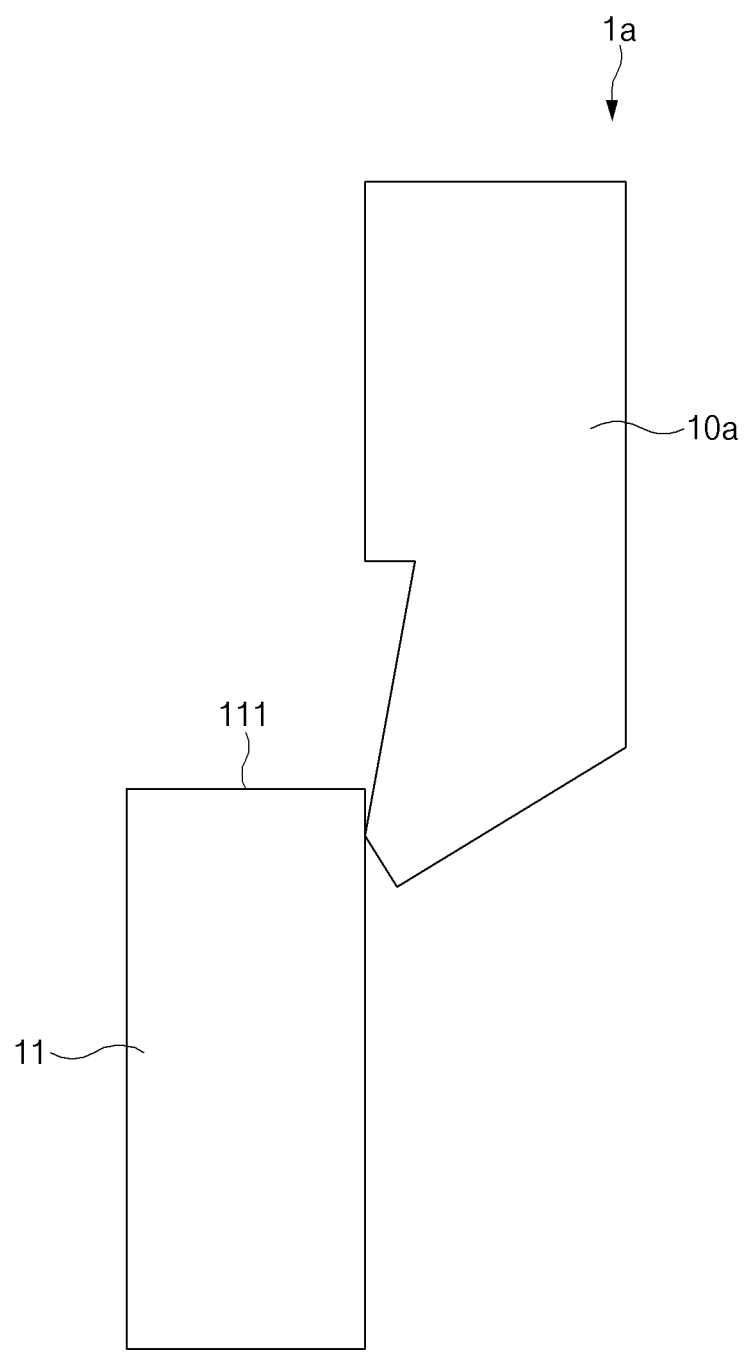
FIG. 4 is a cross-sectional view of a slitter according to another embodiment of the present invention.
Figure 5:
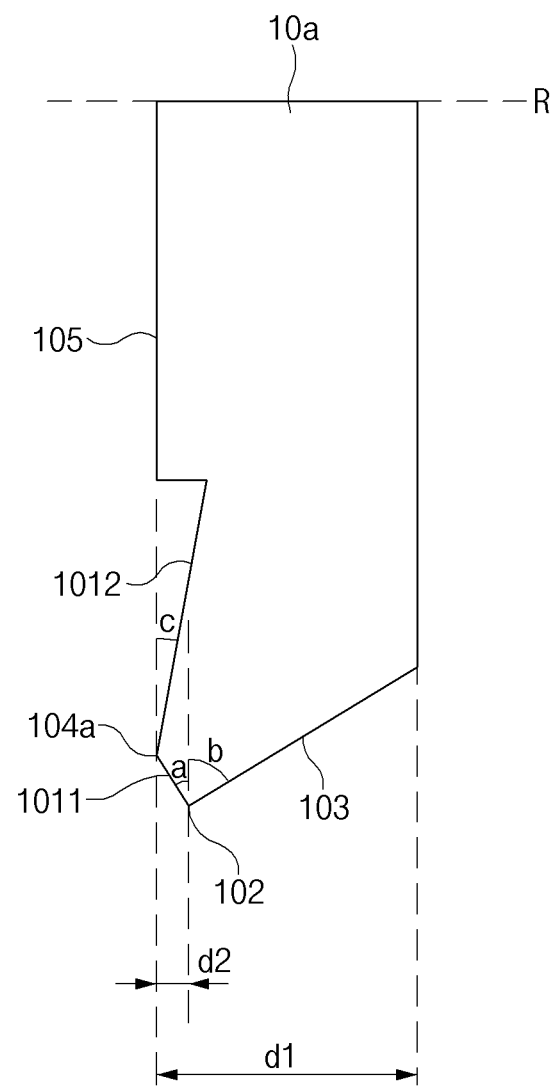
FIG. 5 is a cross-sectional view of an upper knife according to another embodiment of the present invention.

FIG. 4 is a cross-sectional view of a slitter according to another embodiment of the present invention, and FIG. 5 is a cross-sectional view of an upper knife according to another embodiment of the present invention.

As illustrated in FIGS. 4 and 5, a slitter 1 according to another embodiment of the present invention includes: an upper knife 10a disposed above the electrode plate E to rotate, thereby cutting the electrode plate E; and a lower knife 11 disposed below the electrode plate E to partially overlap the upper knife, thereby cutting the electrode plate E together with the upper knife 10a. The upper knife 10a includes: a first inner surface 1011 extending to be inclined from a tip 102 formed at the lowermost end to the lower knife 11; and an outer circumferential surface 103 extending to be inclined from the tip 102 to an opposite side of the lower knife 11. The first inner surface 1011 has an inclination at a first angle a from a vertical line V that is perpendicular to a rotation axis R that serves as a rotation center of the upper knife 10a, and the outer circumferential surface 103 has an inclination at a second angle b from the vertical line V. Also, the upper knife 10a further includes a second inner surface 1012 extending inward from the first inner surface 1011, and the second inner surface 1012 is inclined at a third angle c from the vertical line V.

The first inner surface 1011 is formed to extend from the tip 102 of the upper knife 10a to the lower knife 11 and is inclined at the first angle a from the vertical line V that is perpendicular to the rotation axis R that serves as the rotation center of the upper knife 10a.

The second inner surface 1012 is formed to extend from the first inner surface 1011 toward the inside of the upper knife 10a. Also, the second inner surface 1012 has an inclination at a third angle c from the vertical line V. As a result, as illustrated in FIG. 4, the upper knife 10a and the lower knife 11 may be in contact with a line 104a or a very thin surface. Thus, since a contact area is extremely reduced, even if the upper knife 10a and the lower knife 11 rotate with the same rotational force, shear stress applied to the electrode plate E further increases. Therefore, the upper knife 10a and the lower knife 11 may cut the electrode plate E more cleanly and sharply. This third angle c preferably ranges of 2.6° to 3.1°, and more preferably ranges of 2.8° to 3.0°. The second inner surface 1012 may extend toward the inner side of the upper knife 10a and then be stepped with respect to the support surface 105. However, the present invention is not limited thereto, and a separate curved surface may be formed to naturally connect the second inner surface 1012 to the support surface 105.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

| [Description of the Symbols] | |
|---|---|
| 1: Slitter | 10: Upper knife |
| 11: Lower knife | 101: Inner surface |
| 102: Tip | 103: Outer circumferential surface |
| 121: Upper knife | 122: Lower knife shaft |
| 131: Upper knife spacer | 132: Lower knife spacer |
| 1011: First inner surface | 1012: Second inner surface |

The invention claimed is:

1. A slitter comprising:
an upper knife disposed above an electrode plate, thereby configured to cut the electrode plate;
a lower knife disposed below the electrode plate to partially overlap the upper knife, thereby configured to cut the electrode plate together with the upper knife;
wherein the upper knife comprises:
a first inner surface extending at an incline from a tip formed at a lowermost end to contact an inner surface of the lower knife; and
an outer circumferential surface extending at an incline from the tip to a side opposite the lower knife;
wherein the incline of the first inner surface has a first angle from a vertical line (V) that is perpendicular to a rotation axis that serves as a rotation center of the upper knife;
wherein the incline of the outer circumferential surface has a second angle from the vertical line;
wherein the upper knife and the lower knife are rotary knives;
wherein an outer surface of the lower knife is planar and a thickness of the lower knife is constant; and
wherein the second angle ranges from 80° to less than 90°,
wherein the tip extends radially further from the rotation axis of the upper knife than both the first inner surface and the outer circumferential surface of the upper knife, and wherein the tip is disposed between the first inner surface and the outer circumferential surface in a width direction of the upper knife.

2. The slitter of claim 1, wherein the first angle ranges from 0.6° to 1.1°.

3. The slitter of claim 2, wherein the first angle ranges from 0.9° to 1.0°.

4. The slitter of claim 1, wherein the second angle ranges from 85° to 90°.

5. The slitter of claim 1, wherein, in the upper knife, a horizontal distance from the tip to a contact point with the lower knife ranges from 0.01 mm to 0.5 mm.

6. The slitter of claim 5, wherein, in the upper knife, the horizontal distance from the tip to the contact point with the lower knife ranges from 0.1 mm to 0.4 mm.

7. The slitter of claim 1, wherein the upper knife has a total thickness of 3 mm to 5 mm.

8. The slitter of claim 1, wherein the lower knife comprises a flat outer circumferential surface on which the electrode plate is seated.

9. A slitter comprising:
an upper knife disposed above an electrode plate, thereby configured to cut the electrode plate;
a lower knife disposed below the electrode plate to partially overlap the upper knife, thereby configured to cut the electrode plate together with the upper knife,
wherein the upper knife comprises:
a first inner surface extending at an incline from a tip formed at a lowermost end to contact an inner surface of the lower knife;

an outer circumferential surface extending at an incline from the tip to a side opposite the lower knife; and
a support surface,
wherein the incline of the first inner surface has a first angle from a vertical line (V) that is perpendicular to a rotation axis that serves as a rotation center of the upper knife,
wherein the incline of the outer circumferential surface has a second angle from the vertical line,
wherein the upper knife and the lower knife are rotary knives,
wherein an outer surface of the lower knife is planar and a thickness of the lower knife is constant,
wherein the upper knife further comprises a second inner surface extending inward from the first inner surface, and
wherein the second inner surface is inclined at a third angle from the vertical line, the third angle being an acute angle, the second inner surface extending toward an inner side of the upper knife to define a stepped portion with respect to the support surface of the upper knife.

10. The slitter of claim 9, wherein the third angle ranges from 2.6° to 3.1°.

11. The slitter of claim 10, wherein the third angle ranges from 2.8° to 3.0°.

12. The slitter of claim 9, wherein the upper knife is in line contact with the lower knife.

\* \* \* \* \*